(12) United States Patent
Wang et al.

(10) Patent No.: US 12,293,028 B1
(45) Date of Patent: May 6, 2025

(54) ELECTRONIC DEVICES WITH EXTENDED INPUT-OUTPUT CAPABILITIES

(71) Applicant: Apple Inc., Cupertino, CA (US)

(72) Inventors: Paul X. Wang, Cupertino, CA (US); Benjamin G. Jackson, Piedmont, CA (US); Richard G. Huizar, San Diego, CA (US)

(*) Notice: Subject to any disclaimer, the term of this patent is extended or adjusted under 35 U.S.C. 154(b) by 0 days.

(21) Appl. No.: 18/193,516

(22) Filed: Mar. 30, 2023

Related U.S. Application Data

(63) Continuation of application No. 15/866,778, filed on Jan. 10, 2018, now abandoned.

(60) Provisional application No. 62/551,153, filed on Aug. 28, 2017.

(51) Int. Cl.
*G06F 3/03* (2006.01)
*G06F 3/01* (2006.01)
*G06F 3/0354* (2013.01)
*G06F 3/044* (2006.01)

(52) U.S. Cl.
CPC ............ *G06F 3/0325* (2013.01); *G06F 3/017* (2013.01); *G06F 3/0354* (2013.01); *G06F 3/044* (2013.01)

(58) Field of Classification Search
CPC ...... G06F 3/0325; G06F 3/017; G06F 3/0354; G06F 3/044; G06F 3/0304; G06F 3/0312; G06F 3/0317; G06F 3/033
USPC .......................................... 345/156, 173, 166
See application file for complete search history.

(56) References Cited

U.S. PATENT DOCUMENTS

| | | | |
|---|---|---|---|
| 5,991,431 A | 11/1999 | Borza et al. | |
| 6,424,335 B1 | 7/2002 | Kim et al. | |
| 6,614,422 B1* | 9/2003 | Rafii | G06F 3/04886 |
| | | | 345/169 |
| 7,161,578 B1 | 1/2007 | Schneider | |
| 7,168,047 B1 | 1/2007 | Huppi | |
| 7,710,397 B2 | 5/2010 | Krah et al. | |
| 8,381,135 B2 | 2/2013 | Hotelling et al. | |
| 8,549,418 B2* | 10/2013 | Lamarca | G06F 3/0425 |
| | | | 715/764 |
| 8,624,836 B1 | 1/2014 | Miller et al. | |
| 2003/0132913 A1 | 7/2003 | Issinski | |
| 2008/0062257 A1 | 3/2008 | Corson | |
| 2009/0146955 A1 | 6/2009 | Truong | |
| 2010/0123655 A1 | 5/2010 | Lai | |
| 2010/0295772 A1 | 11/2010 | Alameh et al. | |
| 2011/0102570 A1 | 5/2011 | Wilf et al. | |
| 2011/0167391 A1 | 7/2011 | Momeyer et al. | |

(Continued)

*Primary Examiner* — Jimmy H Nguyen
(74) *Attorney, Agent, or Firm* — Treyz Law Group, P.C.; G. Victor Treyz; Jinie M. Guihan

(57) ABSTRACT

An electronic pointing device such as a computer mouse may be used in gathering user input from a user. The electronic pointing device may be provided with a light source that illuminates a portion of a surface that is overlapped by the mouse and a light sensor configured to monitor movement of the electronic pointing device across the surface based on reflected light from the illuminated portion. The electronic pointing device may have an array of sensors on a housing sidewall configured to gather information on the location of a finger of the user in an area that is laterally adjacent to the electronic pointing device. The sensors may be optical sensors based on light-sources such as light-emitting diodes or lasers and light detectors. Capacitive sensors may also be used in gathering user finger input in the area laterally adjacent to the electronic pointing device.

20 Claims, 19 Drawing Sheets

(56) References Cited

U.S. PATENT DOCUMENTS

| | | |
|---|---|---|
| 2011/0205151 A1 | 8/2011 | Newton et al. |
| 2012/0038542 A1* | 2/2012 | Miyashita ............ G06F 3/0485 345/7 |
| 2012/0120029 A1 | 5/2012 | McCarthy et al. |
| 2012/0274550 A1 | 11/2012 | Campbell et al. |
| 2014/0071069 A1 | 3/2014 | Anderson et al. |
| 2015/0268731 A1* | 9/2015 | Sanaullah ............ G06F 3/0393 345/156 |

* cited by examiner

ELECTRONIC DEVICES WITH EXTENDED INPUT-OUTPUT CAPABILITIES

This application is a continuation of patent application Ser. No. 15/866,778, filed Jan. 10, 2018, which claims the benefit of provisional patent application No. 62/551,153, filed Aug. 28, 2017, both of which are hereby incorporated by reference herein in their entireties.

FIELD

This relates generally to electronic equipment, and, more particularly, to electronic devices with input-output capabilities.

BACKGROUND

Computers and other equipment may sometimes be controlled using pointing devices. For example, a computer mouse may be used in positioning an on-screen cursor on a computer. While the use of a pointing device such as a mouse facilitates interactions with the computer, computer mice are generally limited in their input-output capabilities. This may make it difficult or impossible for a user to supply desired input to a system or to receive appropriate output.

SUMMARY

An electronic device such as a computer mouse, trackpad, laptop computer, desktop computer, or other device may be used in gathering user input from a user. The input may include pointing input from a mouse or other electronic device containing device position sensor circuitry configured to gather information on movements of the mouse and where the mouse or other device is positioned on a surface and may include user finger input, gestures, and other user input.

A mouse or other electronic pointing device may be provided with a device position sensor having a light source that illuminates a portion of a surface that is overlapped by the mouse and having an image sensor configured to determine a location of the electronic pointing device on the surface and/or to measure movement of the electronic device relative to the surface based on captured images of the illuminated portion. Mechanical device position sensors (e.g., encoded wheels that track mouse movements on the surface) may also be used in monitoring movements of the mouse.

A mouse or other electronic pointing device may have an array of sensors on a housing sidewall configured to gather information on the location of a finger of the user in an area that is laterally adjacent to the electronic pointing device. The sensors may be optical sensors based on light-sources such as light-emitting diodes or lasers and light detectors. Capacitive sensors may also be used in gathering user finger input in the area laterally adjacent to the electronic pointing device. If desired, the sensors may be located on housings associated with other devices such as laptop computers, desktop computers, etc.

In some configurations, three-dimensional gestures may be supplied by a user (e.g., by moving the user's fingers or hand through the air near an electronic device). Three-dimensional gesture sensors in the electronic device may detect this user input using one or more visible light cameras and/or one or more infrared cameras, using capacitive sensors (e.g., capacitive sensors having arrays of capacitive sensor electrodes on a device housing), or using other sensors. The sensors in an electronic device may include optical sensors (e.g., arrays of light-emitting devices and corresponding light-detecting devices), grip sensors, force sensors, ultrasonic sensors, accelerometers and other sensors to detect orientation, movement, and vibrations, and/or using other sensors.

Images such as images with selectable labeled virtual keys and/or other selectable visual elements may be projected onto an area of a surface that is laterally adjacent to an electronic pointing device or that is otherwise in the vicinity of an electronic device. Accelerometers may measure user finger input vibrations that are conveyed to an electronic device through the surface. Haptic output devices may be used in providing haptic feedback through the surface. In some arrangements, sensor circuitry may be provided on a sidewall of an electronic device and one or more overlapping haptic output devices may be used in providing a user's finger with haptic output when finger motion along the sensor circuitry on the sidewall is detected.

DETAILED DESCRIPTION

Figure 1:
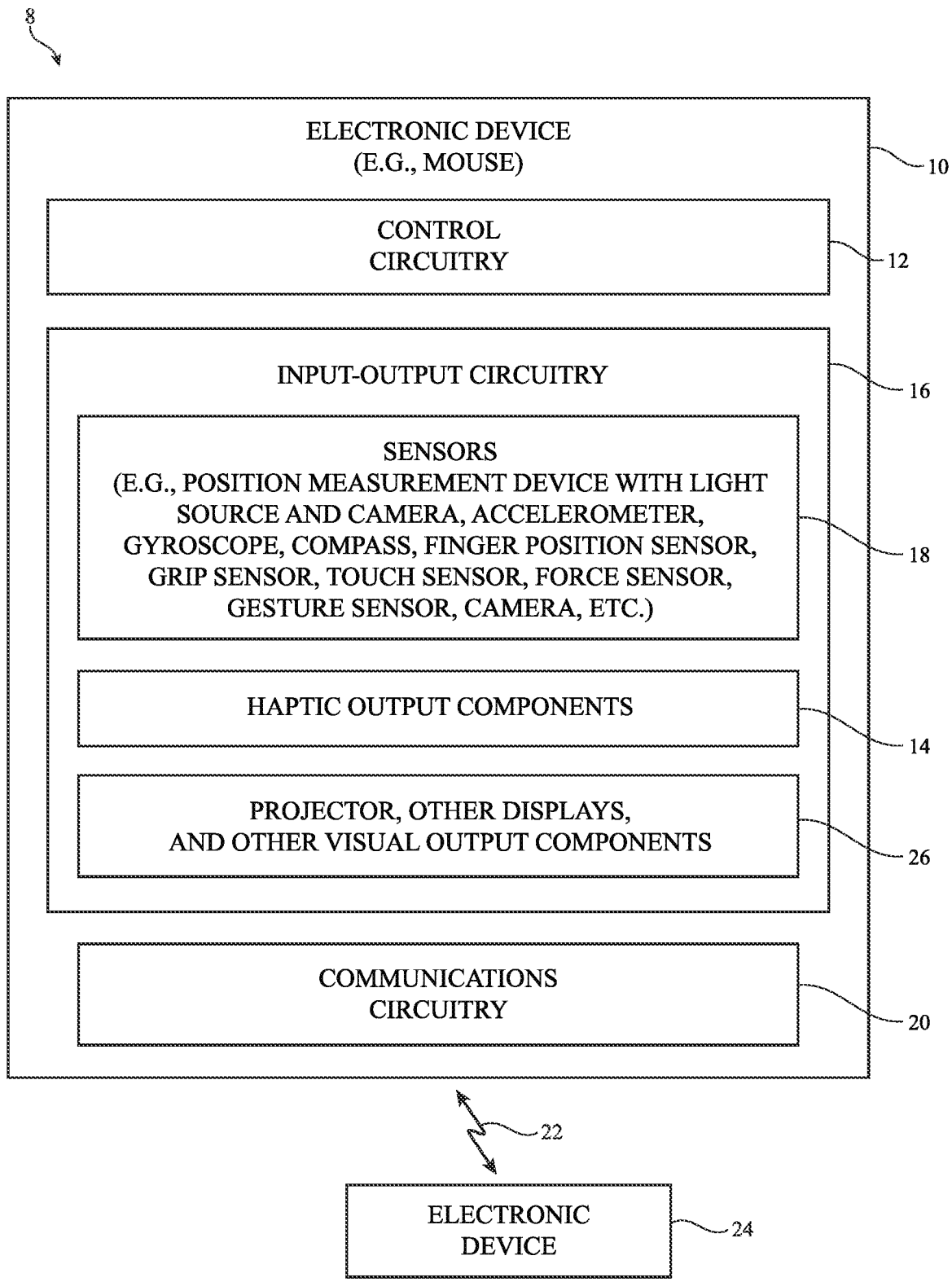
FIG. 1 is a schematic diagram of an illustrative system in accordance with an embodiment.

Electronic systems such as illustrative system 8 of FIG. 1 may include electronic devices such as electronic device 10 and one or more additional electronic devices such as electronic device 24. Device 10 and/or device 24 may be a stand-alone mouse, trackpad, or other pointing device, a laptop computer, a computer monitor containing an embedded computer, a tablet computer, a cellular telephone, a media player, or other handheld or portable electronic device, a smaller device such as a wrist-watch device (e.g., a watch with a wrist strap), a pendant device, a headphone or earpiece device, a device embedded in eyeglasses or other head-mounted equipment worn on a user's head, or other wearable or miniature device, a computer display that does not contain an embedded computer, a gaming device, a navigation device, an embedded system such as a system in which electronic equipment with a display is mounted in a kiosk or automobile, a remote control, a voice-controlled internet-connected speaker (e.g., an artificial intelligence assistance device, home assistant, etc.), a set-top box, equipment that implements the functionality of two or more of these devices, electronic equipment embedded in tables, chairs, desks, other furniture, or other electronic equipment. Illustrative configurations in which device 10 is a computer pointing device such as a computer mouse and in which device 24 is a computer or other electronic equipment that is controlled using input from a user that is gathered by one or more sensors in the computer pointing device may sometimes be described herein as an example. Other devices may be used in system 8, if desired.

As illustrated by communications link 22, device 10 may communicate with one or more additional devices such as device 24. Devices such as device 24 may be peer devices (e.g., additional devices such as device 10), may be accessories (e.g., speakers, headphones, displays, pointing devices, and/or other accessories that operate with device 10), and/or may be one or more electronic devices that are controlled by device 10 (e.g., a computer, television, display with an embedded computer, display without any embedded computer, set-top box, countertop digital assistant, and/or other electronic equipment). Links such as link 22 in system 8 may be wired or wireless communication links. Each device in system 8 such as device 10 may include communications circuitry such as communications circuitry 20 of device 10 for supporting communications over links such as link 22.

Communications circuitry 20 may include wired and wireless communications circuitry. Communications circuitry 20 in one device may be used to support communications over one or more wired or wireless communications links (e.g., link 22) with one or more additional devices (e.g., a peer device, a host, an accessory, etc.). Wireless circuitry in communications circuitry 20 may include one or more antennas and one or more radio-frequency transceiver circuits. Wireless communications circuitry may be used to support wireless communications over cellular telephone bands, wireless local area network bands, near field communications bands, etc.

Each of the electronic devices in system 8 such as illustrative electronic device 10 may include control circuitry such as control circuitry 12 of device 10. Control circuitry 12 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 may be used to control the operation of device 10. The processing circuitry may be based on one or more microprocessors, microcontrollers, digital signal processors, baseband processors, power management units, audio chips, application specific integrated circuits, etc.

Input-output circuitry may be included in each device in system 8. As shown in FIG. 1, for example, device 10 may include input-output circuitry 16 to allow data to be supplied to device 10 and to allow data to be provided from device 10 to external devices such as device 24. Input-output circuitry 16 may include input-output devices such as buttons, joysticks, scrolling wheels, touch pads, key pads, keyboards, microphones, speakers, tone generators, vibrators, cameras, displays and/or other light-emitting components, light-emitting diodes and other status indicators, data ports, etc.

As shown in FIG. 1, for example, input-output devices 16 may include sensors such as sensors 18. Sensors 18 may include microphones, force sensors, touch sensors, temperature sensors, air pressure sensors, moisture sensors, ambient light sensors and other light-based sensors, magnetic sensors, sensors for measuring movement of device 10 along a surface (e.g., a light source such as a light-emitting diode and/or laser diode and a corresponding visible light or infrared camera that captures images of a portion of work surface under device 10 as device 10 is moved across the work surface, device position (movement) sensors based on rotating wheels that track surface movements, etc.), image sensors for such as visible-light and infrared cameras (e.g., digital image sensors and lenses for measuring three-dimensional hand gestures and other user gestures, etc.), grip sensors (e.g., capacitance-based grip sensors, optical grip sensors, etc.), and/or other sensors. If desired, sensors 18 may include sensors for measuring the orientation, movement, and/or position of device 10 such as inertial measurement units that include accelerometers, compasses, and/or gyroscopes. An accelerometer may be used to measure vibrations that pass to device 10 through a tabletop or other surface from a user's fingers.

In some configurations, circuitry 16 may include an image projector that projects images onto a portion of a surface on which device 10 is resting (e.g., a portion that is laterally adjacent to device 10) or other surface in the environment surrounding device 10, may contain other types of display device (e.g., a light-emitting diode display such as an organic light-emitting diode display, a liquid crystal display, an electrophoretic display, etc.), and/or may contain other output components (see, e.g., components 26). Components 26 may include speakers and other components that create sound, status indicator lights and other light-emitting components, and/or other components that generate output.

During operation, electronic device 10 may gather user input such as user pointing input such as trackpad input or mouse input indicative of the location of a mouse on a surface on which device 10 is resting. Device 10 may also gather user input such as user finger input in a region of the surface that is laterally adjacent to device 10, may gather grip input (e.g., from a user's fingers gripping the housing of device 10), may gather three-dimensional gestures (e.g., hand gestures), and/or may gather additional user input. Control circuitry 12 may, for example, use sensors 18 to gather information such as information on the position of a user's finger on a work surface such as the top of a table on which device 10 is resting, the position of a user's finger or other body part moving through the air near to device 10, grip input, and/or other user input. This additional user input may help extend the input capabilities of device 10 and thereby supplement the information gathered using buttons, touch sensors, pointing device movement sensors, and other input devices in device 10. User input may be used in manipulating visual objects (e.g., icons, etc.), may be used in supplying system 8 with text, may be used in making menu selections, and/or may otherwise be used in operating the equipment of system 8.

Haptic output components 14 may be used for providing a user with haptic output. Haptic output components 14 may include piezoelectric devices, electromagnetic actuators (e.g., servomotors, linear actuators, vibrators, etc.), actuators based on electroactive polymers, actuators based on shape memory alloy structures, and/or other haptic output components. Haptic output components 14 in input-output devices 16 may be used to provide haptic output to a user based on sensed user input, wirelessly received information, and/or other information. In some configurations (e.g., when a haptic output component 14 has a piezoelectric material), components can serve both as haptic output components 14 and as sensors 18. For example, a piezoelectric material may be driven with a signal to supply haptic output and, when not driven, may produce an output signal indicative of applied force.

Figure 2:
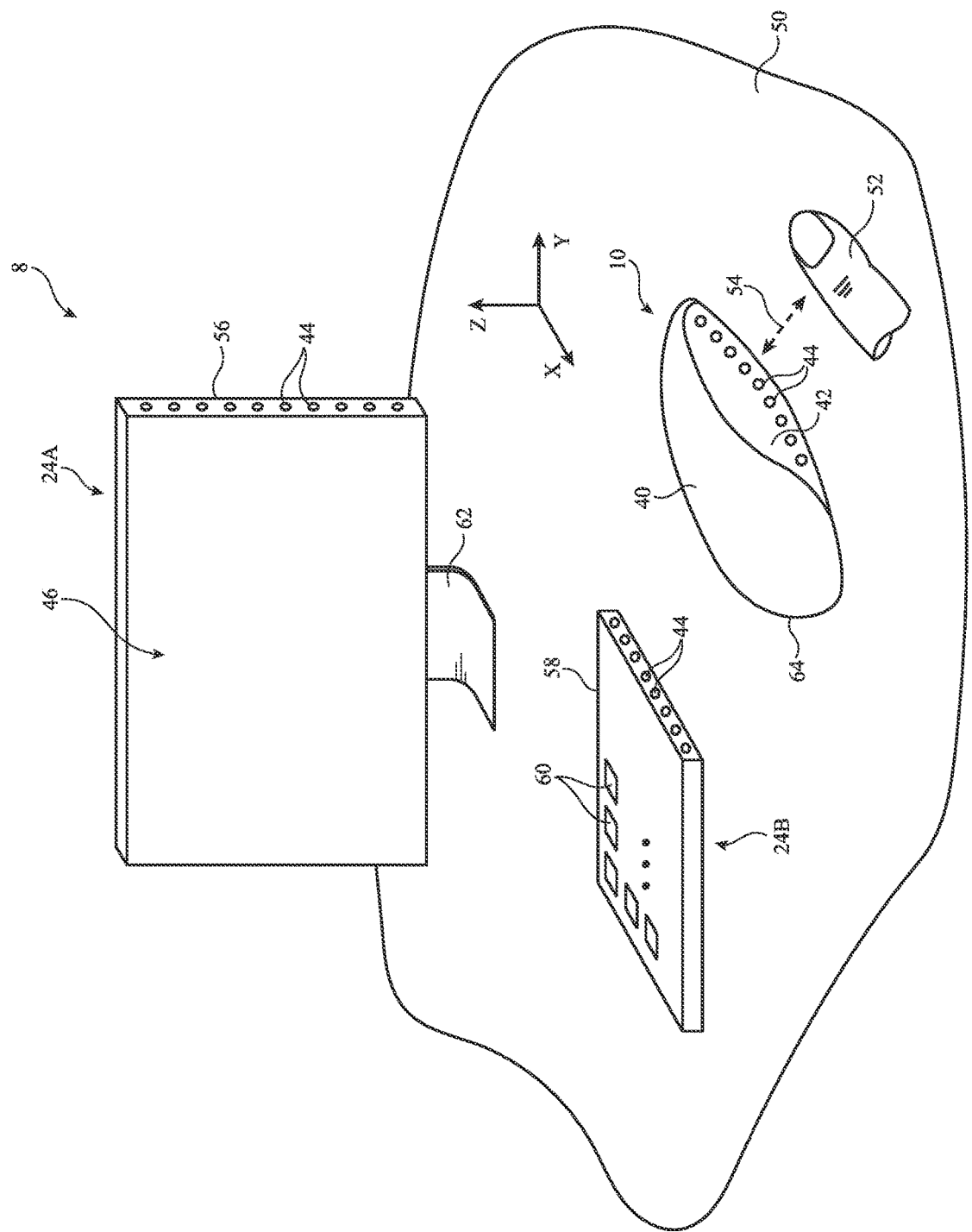
FIG. 2 is a perspective view of an illustrative system in accordance with an embodiment.

FIG. 2 is a perspective view of an illustrative system that includes device 10 and a pair of additional devices such as devices 24A and 24B. In the example of FIG. 2, device 10 is pointing device such as a mouse and can gather user pointing input as a user moves device 10 across a work surface such as surface 50 (e.g., top of a table, a mouse pad surface, etc.).

Device 24A may be a computer or other display device. As shown in FIG. 2, device 24A may have opposing front and rear faces. Display 46 may be mounted on the front face of device 24A and housing 56 may have a rear housing wall that covers that opposing rear face of device 24A. A stand such as stand 62 may support housing 56.

Device 24B may be a keyboard having keys 60 mounted in keyboard housing 58. Devices 24B and 10 may communicate with device 24A over communications links 22 of FIG. 1.

During operation, a user may grip device 10 with the user's hand. Device 10 may have a housing such as housing 64. Housing 64 may be formed from metal, polymer, glass, ceramic, fabric, other materials, and/or combinations of two or more of these materials. Housing 64 may have an upper wall that forms upper surface 40 and sidewalls that form sidewall surfaces such as sidewall surface 42. In some configurations (e.g., when the circuitry of electronic equipment such as device 10 is embedded in furniture), structures such as housing 64 (e.g., a tabletop, desktop, or other furniture structure forming a surface or other portion of an item of furniture) may be formed from wood or other natural materials, metal, polymer, glass, fabric, ceramic, other materials, and/or combination of two or more of these materials.

Device 10 has a device position monitoring component that monitors the position of device 10 on surface 50 (e.g., the position of device 10 in the X-Y plane in the example of FIG. 2). In addition, device 10 may have one or more other sensors that monitor the position of portions of the user's body (e.g., one or more fingers such as finger 52). For example, device 10 may have sensors 44 on sidewall surface 42 to detect the position of fingers such as finger 52 in the X-Y plane and, if desired, along dimension Z. Sensors 44 may be optical sensors, capacitive sensors, acoustic sensors, and/or other sensors for measuring finger position and/or the position of other user body parts (e.g., hand position, etc.). Signal 54 (e.g., light, sound, or other signals) may interact with finger 52 and may allow sensor(s) such as sensors 44 to detect the position (and therefore the movement) of finger 52 relative to sensors 44. With this arrangement, a user may use a portion of surface 50 that lies laterally adjacent to device 10 (e.g., to the right of device 10 in the example of FIG. 2) as a supplemental input surface. This allows a user to effectively provide input that might be difficult to provide directly to the body of device 10 (e.g., directly to buttons or a touch sensor on housing 64).

As an example, a user may move finger 52 to move a cursor on a display such as display 46, to select an item in a list, to highlight an item, to drag and drop items, to launch an item, and/or to otherwise interact with system 8. User input may include finger taps (single taps, double taps, triple taps, gestures formed from lingering finger positions (hovers, persistent finger presence in a particular location on surface 50), single-finger swipes, multi-finger swipes, pinch-to-zoom gestures and other multi-touch finger gestures, hand gestures, other two-dimensional and three-dimensional gestures (e.g., waving a user's hand and fingers in the air near sensors 44, etc.), and/or any other suitable user input from a user body part, stylus controlled by a user, and/or other external objects. User input may include user finger movements on surface 50 and/or above surface 50 or other locations in the air near device 10.

Sensors 44 may be located on sidewall surfaces such as sidewall surfaces 42, on upper surface 40, and/or other portions of device 10. Sensors 44 may also be located on other equipment in system 8. As shown in FIG. 2, for example, an array of sensors 44 may be mounted on housing 56 of device 24A (e.g., on a sidewall, front wall, and/or rear wall of housing 56) and/or on housing 58 of device 24B (e.g., on a top housing wall, on a side housing wall such as a front, rear, left, or right housing wall, etc.).

Figure 3:
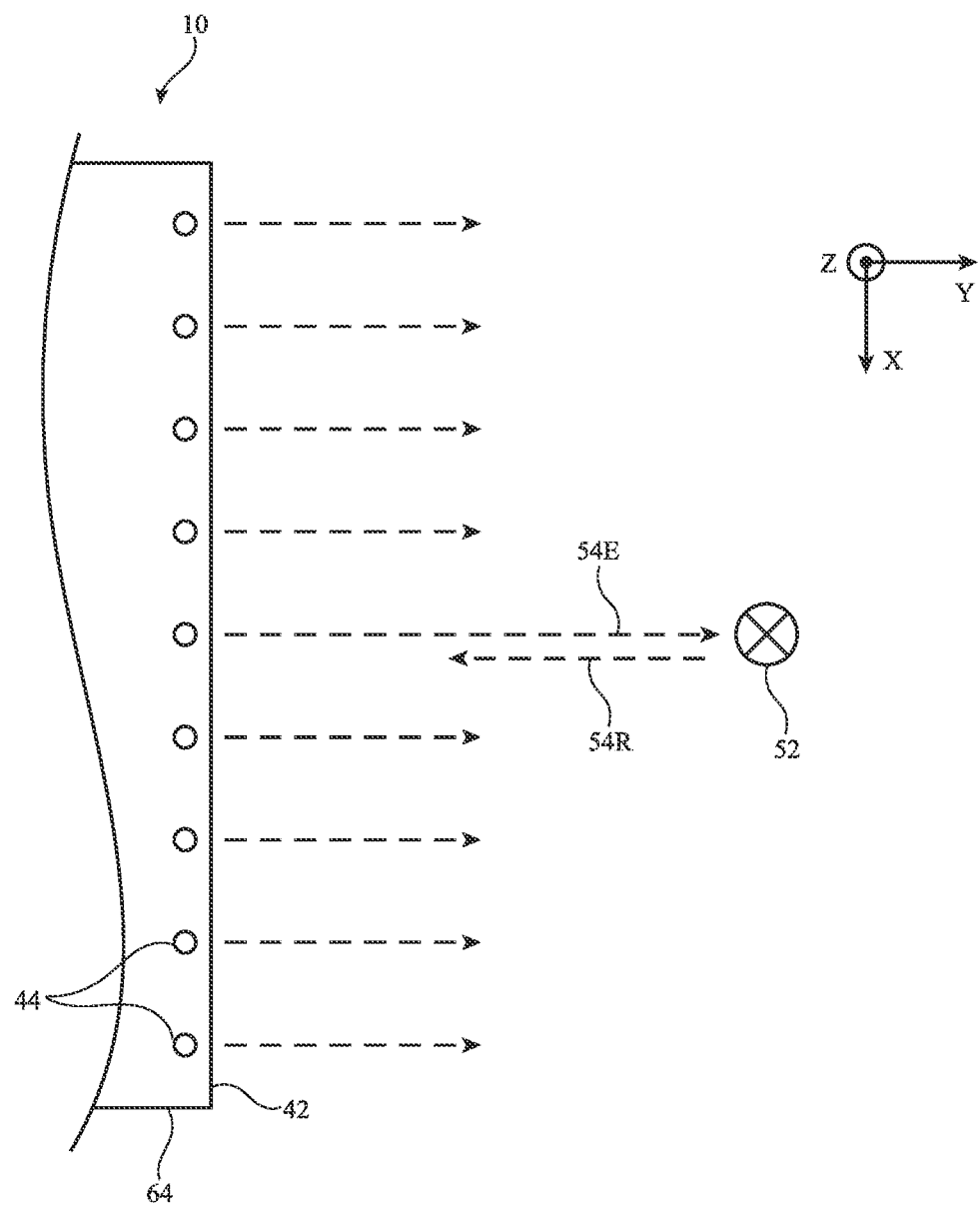
FIG. 3 is a diagram of a portion of an illustrative electronic device with an array of sensor components in accordance with an embodiment.

FIG. 3 is a top view of a portion of device 10 in an illustrative configuration in which sensors 44 are optical sensors. There may be an array of sensors 44 (e.g., a one-dimensional or two-dimensional array) extending along one or more sidewall surfaces 42 of housing 64. Each sensor 44 may include a light-emitting device such as a light-emitting diode or laser and may include a corresponding light detector (e.g., a photodiode, etc.). If desired, sensors 44 may include different numbers of light-emitting devices and light detectors.

During operation, some of the emitted light rays from sensors 44 may be reflected from the fingers of a user. As an example, a user may place finger 52 on surface 50 (FIG. 2) in the X-Y plane adjacent to device 10 and sensors 44. Due to the presence of finger 52, an emitted light ray such as light ray 54E will reflect from finger 52 as reflected ray 54R. Reflected ray 54R may be detected by a detector in one or more of sensors 44 and this reflected signal information may be processed to determine the location of finger 52. For example, the location of finger 52 in X and Y coordinates on planar work surface 50 in the example of FIG. 3 may be determined by analyzing which light rays are reflected, analyzing the intensity of reflected light, etc. If desired, different light-emitting diodes or lasers in sensors 44 may be modulated with different patterns (e.g., different frequencies, different digital codes, etc.) to help identify the source of reflected light and thereby help identify the location of finger 52.

Figure 4:
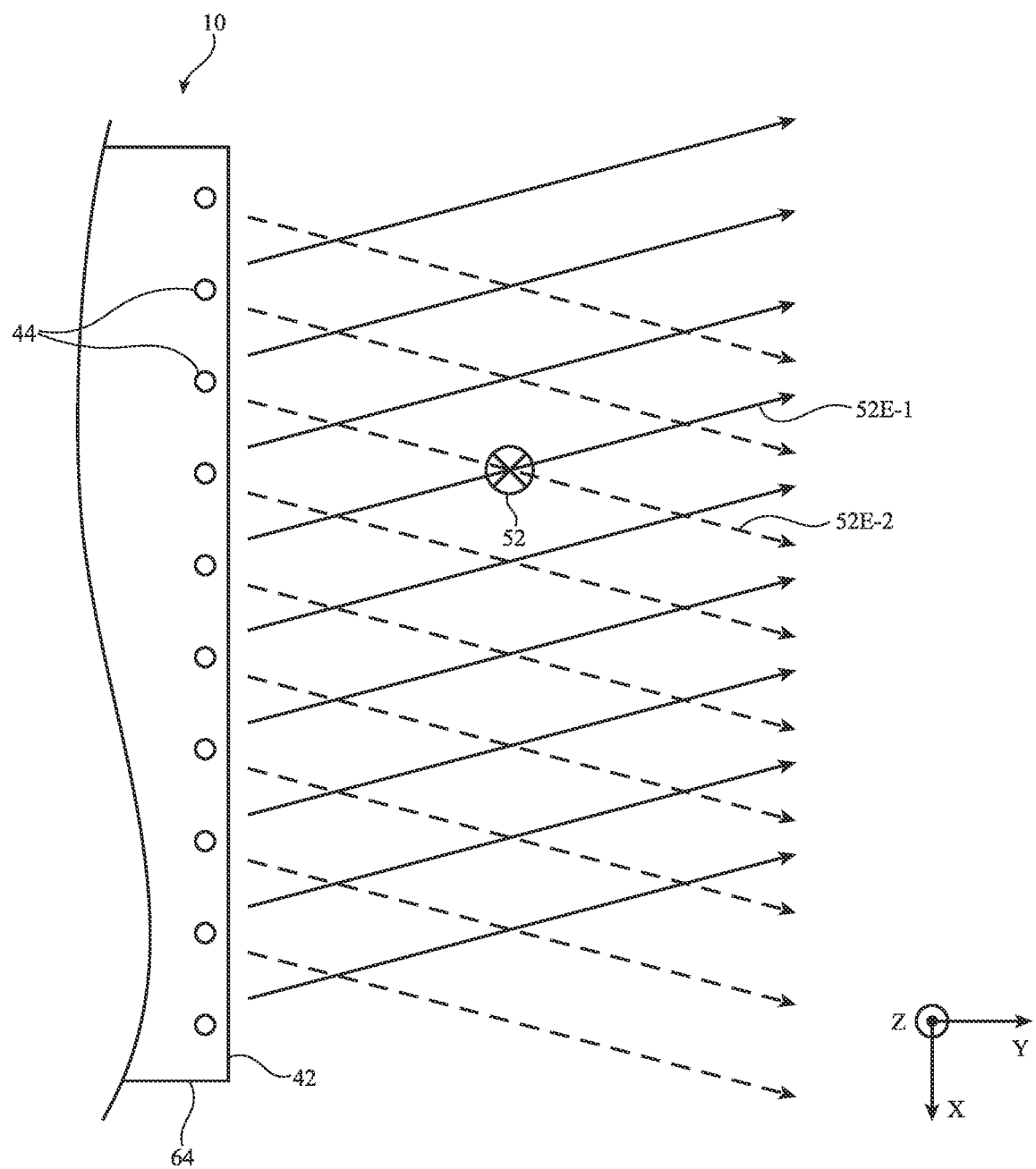
FIG. 4 is a diagram of a portion of an illustrative electronic device with an array of sensor components that use angled light beams in accordance with an embodiment.

As shown in FIG. 4, sensors 44 may be configured to emit light rays 54 in a pattern in which some rays are angled upwards and some rays are angled downwards. This may help device 10 identify the location of finger 52. For example, if a reflected light signal associated with emitted ray 52E-1 is detected and another reflected light signal associated with emitted ray 52E-2 is detected, it can be concluded that finger 52 is located at the intersection of rays 52E-1 and 52E-2 as shown in FIG. 4.

Figure 5:
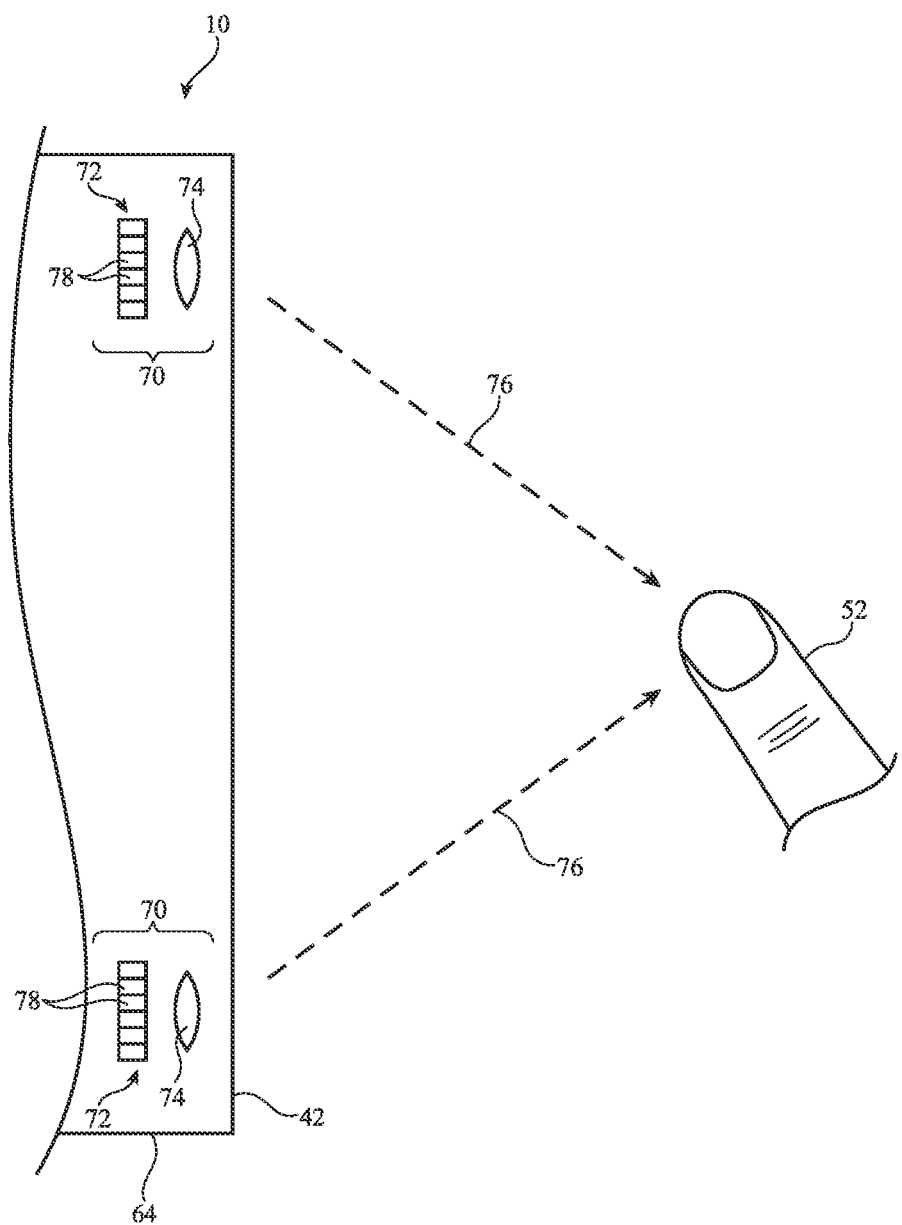
FIG. 5 is a diagram of a portion of an illustrative electronic device with a sensor based on image sensor components in accordance with an embodiment.

As shown in the example of FIG. 5, device 10 may have one or more optical sensors such as cameras 70 for monitoring finger position. Each camera 70 may have a digital image sensor 72 with an array of sensor pixels 78. Each camera 70 may also have an optical system such as lens 74. Lens 74 may contain one or more lens elements and may be used to focus images of finger 52 onto a corresponding image sensor 72. Image sensors 72 may be sensitive to visible light (e.g., cameras 70 may be visible light cameras) and/or may be sensitive to infrared light (e.g., cameras 70 may be infrared cameras).

Images of finger 52 that are taken with two or more cameras 70 may be stereoscopic. Accordingly, images taken of finger 52 may be used in identifying the location of one or more fingers 52 in three-dimensional space. Camera-based sensor systems such as cameras 70 may be mounted in housing 64 so that finger position data can be gathered along the side of device 10 (e.g., by placing cameras on side surface 42), above the top of device 10, and/or in other suitable locations. Three-dimensional finger imaging using cameras 70 may be used to capture three-dimensional gestures with the user's hands and fingers (e.g., air gestures such as waves, etc.).

Figure 6:
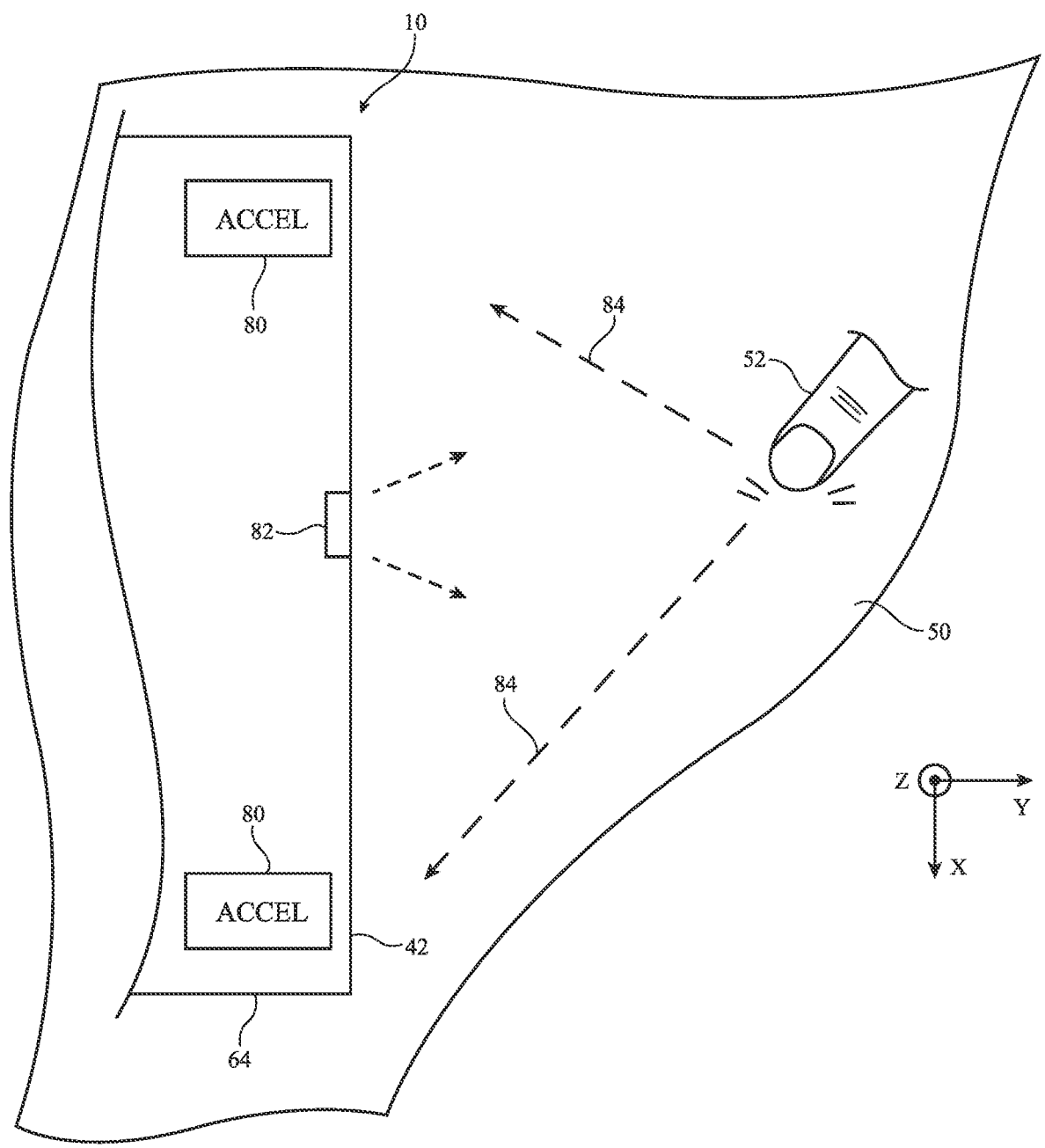
FIG. 6 is a top view of a portion of an illustrative electronic device having sensors such as accelerometers and an optional image sensor for gathering user input in accordance with an embodiment.

As shown in FIG. 6, device 10 may contain vibration sensors such as accelerometers 80. When a user taps on surface 50 (e.g., a table top) with finger 52, vibrations 84 can be sensed by accelerometers 80. Using triangulation techniques, time-of-flight analysis, and/or measurements of vibration intensity, information from each of accelerometers 80 may be processed to determine the location of finger 52 in the X-Y plane. If desired, accelerometer measurements may be supplemented using other finger position measurements. As an example, one or more cameras such as camera 82 may be used in monitoring the position of finger 52 in addition to using accelerometer(s) 80, as described in connection with cameras 70 of FIG. 5. There may, in general, be any suitable number of accelerometers 80, cameras 82, and/or other sensors 44 for detecting the position of one or more fingers 52 (e.g., at least two each type of sensor, at least three, at least ten, fewer than 20, etc.). Sensors may be used to gather finger position measurements adjacent to device 10 (e.g., on or near to surface 50) and/or may be placed on top surface 40 and/or other portions of housing 64 to gather finger position measurements for fingers hovering over device 10, etc.).

Figure 7:
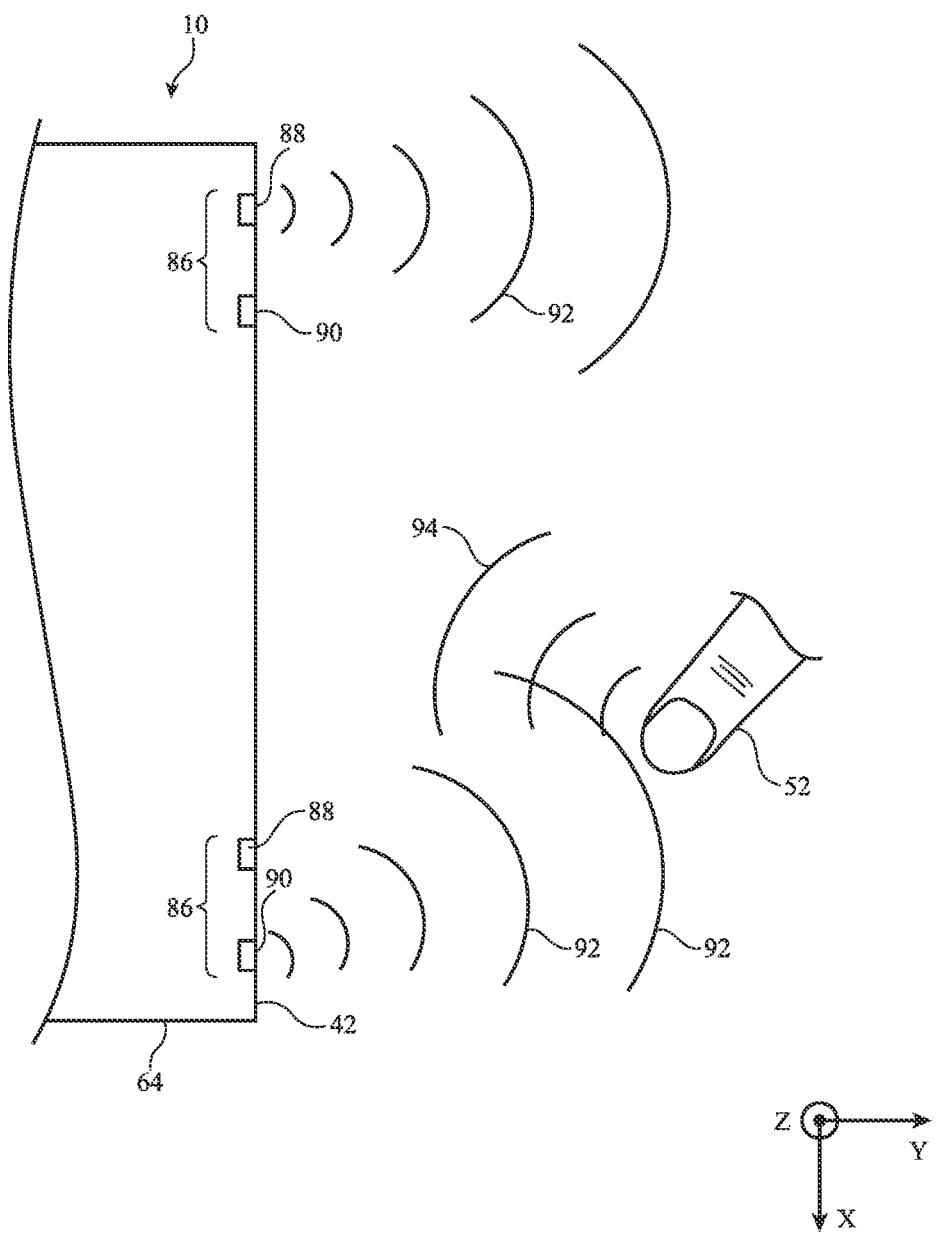
FIG. 7 is a top view of a portion of an illustrative electronic device having ultrasonic sensing circuitry in accordance with an embodiment.

In the illustrative configuration of FIG. 7, ultrasonic sensors 86 are being used to measure finger position. Each ultrasonic sensor 86 may include an ultrasonic sound transmitter 88 (e.g., an ultrasonic transducer) and a microphone or other ultrasonic sound detector 90. During operation, transmitted ultrasonic signals 92 may reflect off of fingers such as finger 52 as shown by reflected signals 94 and may be detected by ultrasonic sound detectors (microphones) 90. Time-of-flight techniques (e.g., echolocation techniques), and/or other ultrasonic sensor positioning techniques may be used by device 10 to measure the positions of fingers 52.

Figure 8:
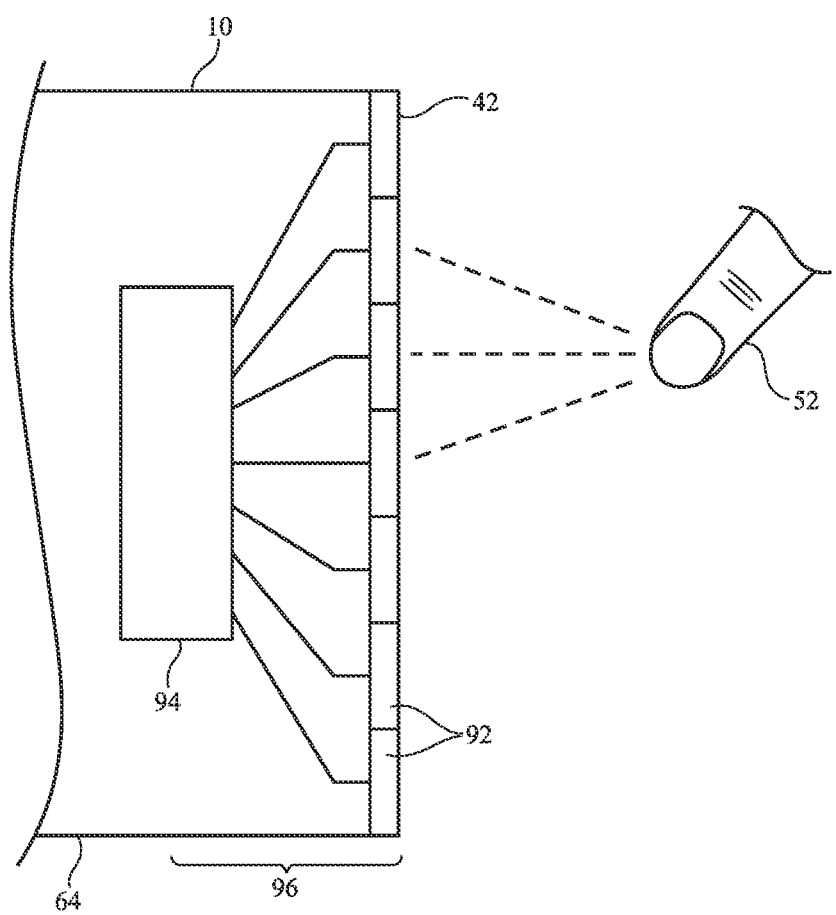
FIG. 8 is a diagram of a portion of an illustrative electronic device having a sensor that detects finger movements such as a long-range capacitive sensor with an array of electrodes in accordance with an embodiment.

FIG. 8 is a diagram showing how electronic device 10 may contain a capacitive sensor (capacitance sensor) such as capacitive sensor 96. Capacitive sensor 96 may include an array of capacitive sensor electrodes 92 (e.g., metal patches, metal lines, and/or other conductive electrode structures). Capacitive sensor 96 may have capacitive sensor circuitry 94 that analyzes capacitance measurements made with electrodes 92 to determine the location of finger 52 relative to each of electrodes 92. In this way, sensor 96 may monitor the location of fingers such as finger 52. Electrodes 92 may be formed along one or more sides 42 of housing 64 and/or may be formed on upper surface 40 (as examples).

Figure 9:
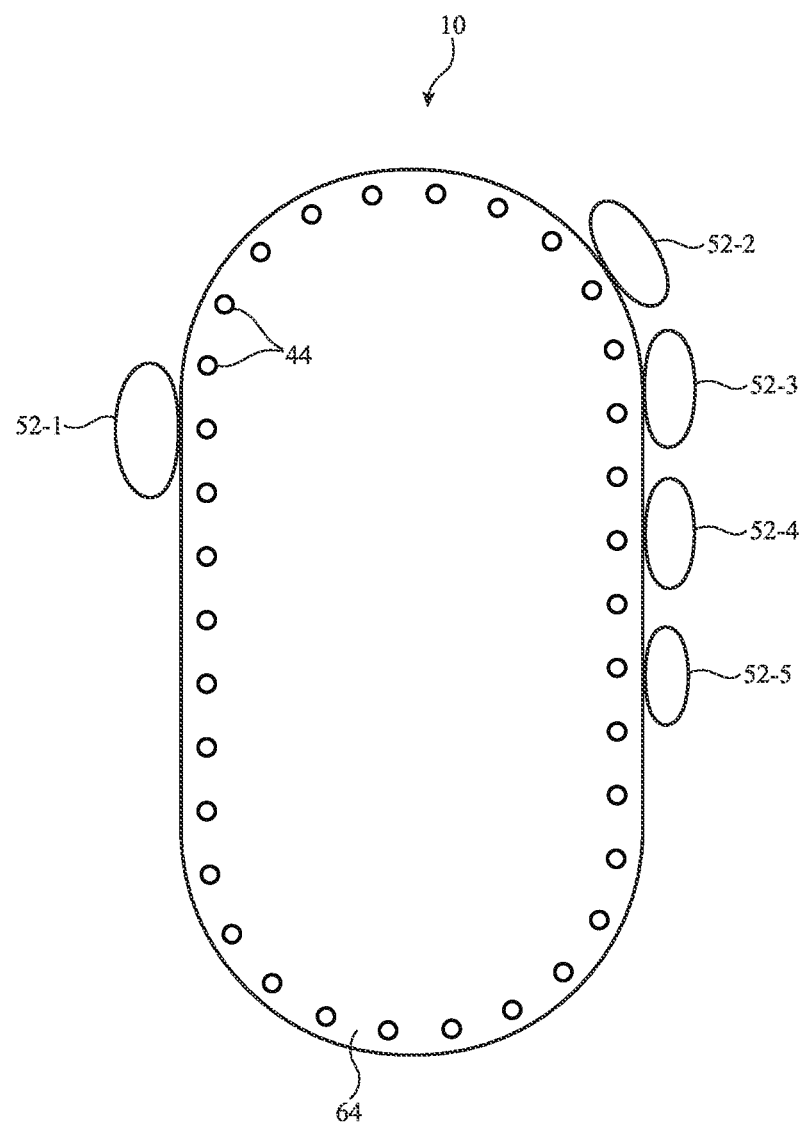
FIG. 9 is a top view of an illustrative electronic device with a grip sensor in accordance with an embodiment.

The user's fingers may be detected using electrodes 92 in sensor(s) 96 and/or other grip detection circuitry (e.g., an array of optical sensors, ultrasonic sensors, an array of force sensors, or other finger position sensors 44), as illustrated by the detection of fingers 52-1, 52-2, 52-3, 52-4, and 52-5 as a user is gripping housing 64 of device 10 in FIG. 9. When device 10 detects the grip of a user, device 10 may awaken from a low power sleep state, device 10 may take additional sensor measurements, device 10 may turn off unused sensor circuitry (e.g., long range sensors that are monitoring for longer-range finger movements such as hand wave gestures), and/or device 10 may take other suitable action. If desired, control circuitry 12 in device 10 may process grip information to determine whether a user is holding device 10 in a left hand or a right hand, to help identify a user (e.g., as part of a biometric identification scheme), may be used to help determine the current operating orientation of device 10 (e.g., in an arrangement in which device 10 can be operated in multiple different orientations such as a normal orientation and a 180° flipped orientation), etc.

Figure 10:
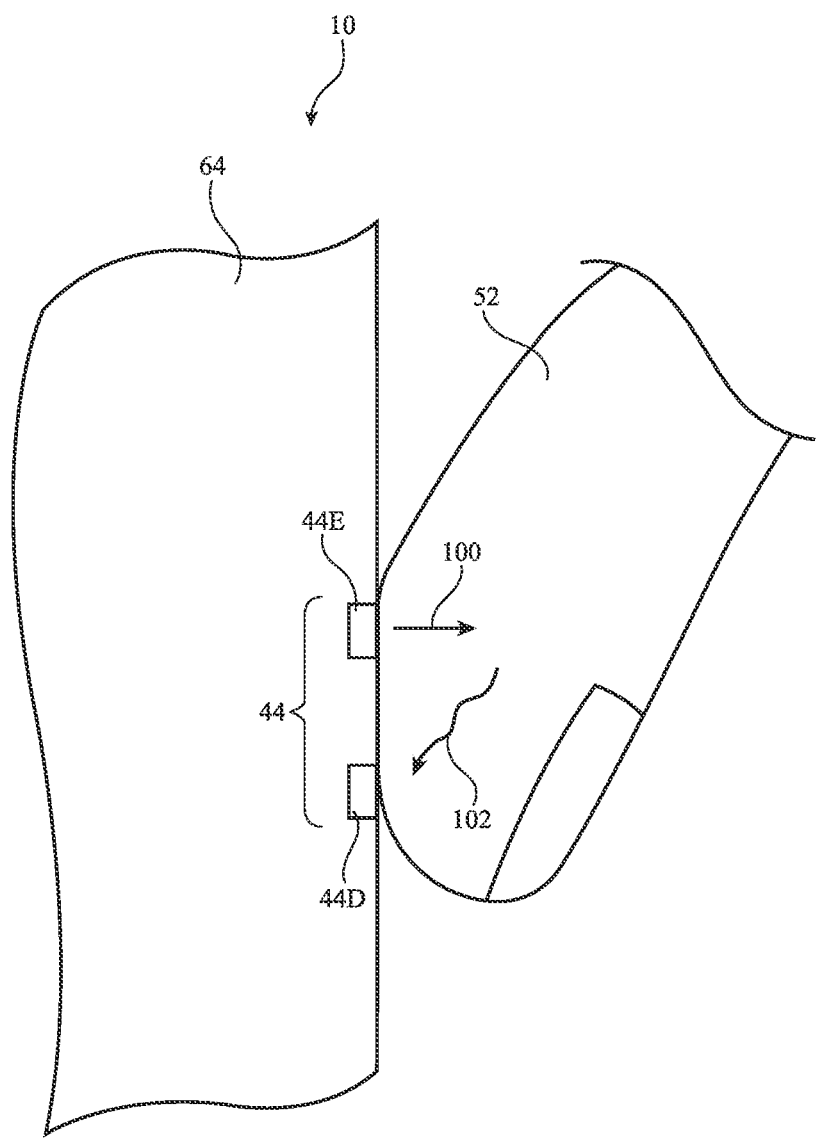
FIG. 10 is a cross-sectional side view of an optical sensor that senses finger compression by detecting changes in finger color in accordance with an embodiment.

In some arrangements, an optical sensor may measure finger color to determine whether a finger is being pressed weakly or strongly against housing 64. This type of configuration for a sensor 44 in device 10 is shown in FIG. 10. As shown in FIG. 10, finger 52 may press against housing 64. While pressing against housing 64, emitter 44E may emit light 100 into the flesh of finger 52. Sensor 44 may have a color sensitive light sensor such as color-sensing light detector 44D. The color of the user's finger 52 will tend to be pinkish when finger 52 is not being pressed against housing 64 and is therefore full of blood. When finger 52 is pressed against housing 64, the blood vessels in finger 52 will tend to hold less blood and will therefore appear whiter. During operation, the color of light 102, which is produced when emitted light 100 is reflected by the flesh of finger 52, can be measured using color-sensing light detector 44D to determine whether finger 52 is whitish or pinkish. This allows control circuitry 12 to determine the amount of force being used to press finger 52 against housing 64 (e.g., the optical finger position sensor of FIG. 10 also measures finger pressure against housing 64).

Figure 11:
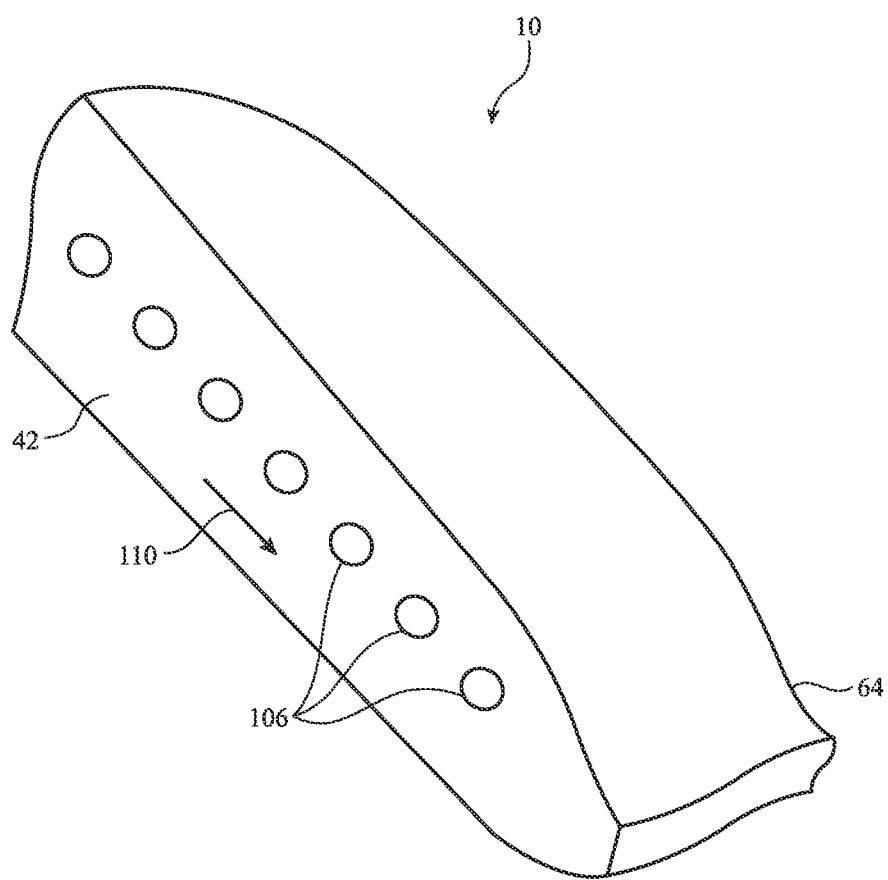
FIG. 11 is a perspective view of an edge portion of an electronic device having an array of sensors and haptic output devices in accordance with an embodiment.

In the example of FIG. 11, components 106 have been formed along sidewall surface 42 of housing 64 in device 10. Components 106 may include capacitive sensors (e.g., capacitive touch sensors and/or longer-range capacitive sensors that can detect the present of finger 52 at larger distances), optical sensors (e.g., optical sensors for touch and/or force measurements), force sensors (e.g., piezoelectric force sensors, strain gauges, capacitive force sensors, etc.), and/or other sensors. These sensors may measure finger movement along surface 42 and other user input. Components 106 may also include piezoelectric devices and/or other haptic output components 14 (FIG. 1). As the user's finger is detected moving along surface 42 over components 106 in direction 110 by the sensors in components 106, corresponding haptic feedback may be generated using haptic output components 14 in components 106. For example, shear force haptic output and/or haptic output normal to surface 42 may be generated to provide the user's finger 52 with a sensation of crossing a detent (e.g., a virtual boundary) located at a given location along the length of surface 42.

Figure 12:
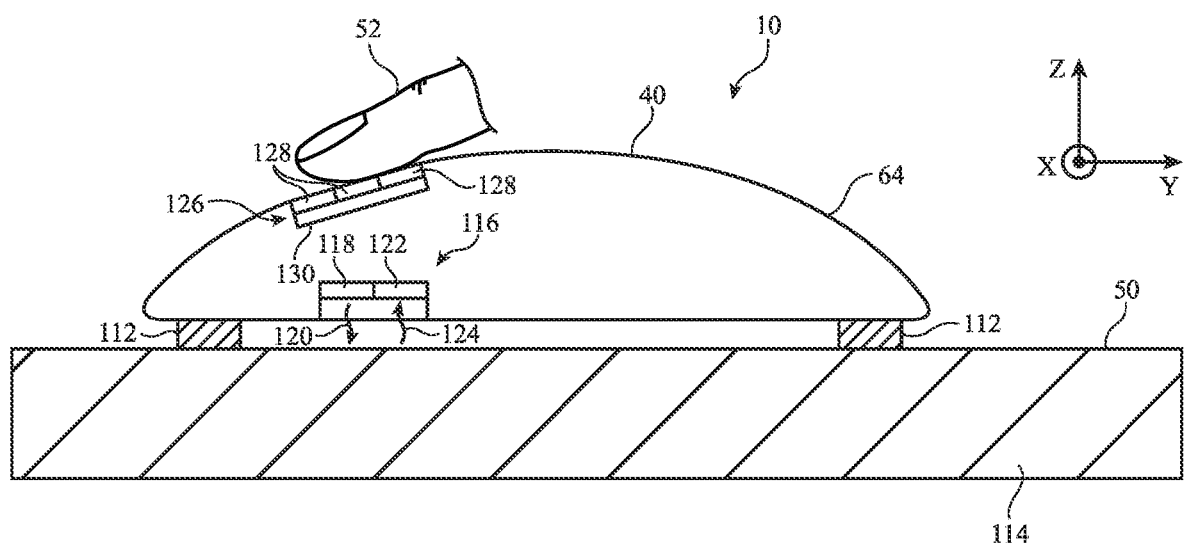
FIG. 12 is a cross-sectional side view of an illustrative electronic device such as a mouse having a haptic output component in accordance with an embodiment.

FIG. 12 is a cross-sectional side view of an illustrative electronic device such as a mouse or other pointing device. As shown in FIG. 12, device 10 may have anti-friction pads 112 under housing 64 to facilitate movement of device 10 across working surface 50 of support 114 (e.g., a table). Component 116, which may sometimes be referred to as a position sensor, movement sensor, and/or pointing information sensor, may be used in monitoring the position in the X-Y plane of device 10 and/or in gathering information on movement of device 10 and housing 64 relative to surface 50. During operation, light source 118 (e.g., a laser or light-emitting diode) of component 116 emits light 120. Light 120 illuminates a portion of surface 50 overlapped by housing 64. Light 124 that is reflected from the illuminated portion of surface 50 can be detected by image digital image sensor 122. In particular, digital image sensor 122 (e.g., a low resolution camera or other light sensor) may gather image data on surface 50 using reflected light 124. By analyzing the measurements from sensor 122 (e.g., by analyzing the information gathered by component 116 that is associated with movement of device 10 and housing 64 across surface 50), the position of device 10 in dimensions X and Y can be determined by control circuitry 12. By gathering device position and/or device movement information with component 116 in this way, device 10 may serve as a mouse or other pointing device. During operation, pointing information (e.g., position and/or motion information associated with movement of device 10 and housing 64 relative to surface 50 that can be used to point an on-screen cursor or perform other control operations in system 8) may be provided from device 10 to a computer or other equipment in system 8 for use in controlling the computer or other equipment.

Device 10 of FIG. 12 may have a haptic input-output device 126. Device 126 may have a segmented force detector with multiple force detecting elements (segments) 128. This allows the force of a finger press from finger 52 to be measured across a portion of surface 40. Force sensor elements 128 may be piezoelectric elements that can serve both as force detectors and as haptic output devices and/or device 126 may be provided with a separate haptic output device overlapping force detecting elements 128 as shown by haptic output device 130. During operation, haptic output device 130 may provide haptic output to elements 128 and the user's finger overlapping one or more of elements 128. When a user's finger presses primarily on a middle location in segments 128, haptic feedback of moderate intensity may be generated by haptic output device 130 (e.g., to produce a tactile "click" for the user). If the user's finger is detected as pressing primarily on a peripheral element 128, haptic feedback of larger intensity may be generated (e.g., to ensure that the haptic feedback is felt with sufficient force by the user.).

Figure 13:
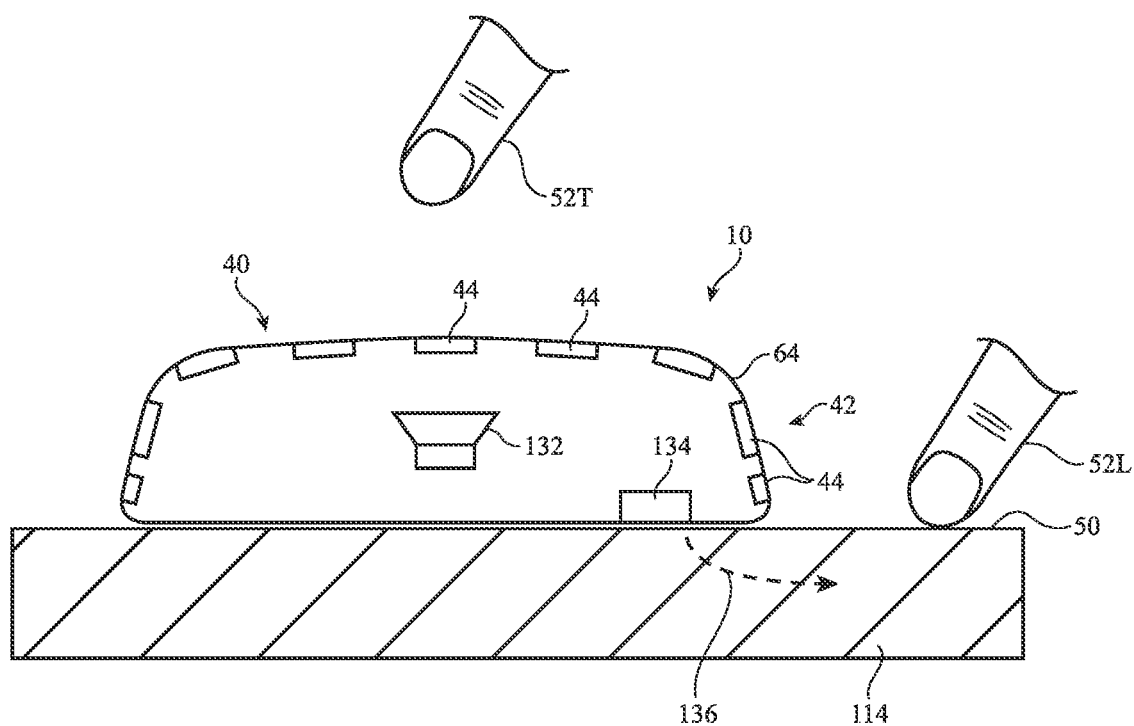
FIG. 13 is a cross-sectional side view of an illustrative electronic device such as a mouse having a speaker and a haptic output device configured to transmit vibrations to a user's finger through a work surface such as a table in accordance with an embodiment.

The cross-sectional side view of illustrative device 10 that is shown in FIG. 13 shows how an audio component such as speaker 132 may be formed in housing 64. Speaker 132 may be used to provide audio feedback such as audible clicks as a user supplies input to device 10 (e.g., a click each time a user presses on housing 64, taps on surface 50, etc.). Sensors 44 (e.g., optical sensors with emitters and detectors, capacitive sensor electrodes, infrared and/or visible light cameras, etc.) may be formed on upper surface 40 of housing 64 to measure the positions of hovering fingers 52T (e.g., fingers associated with three-dimensional gestures through the air) and/or may be formed on sidewall surfaces 42 to measure the positions of fingers such as finger 52L that are supplying input on a laterally adjacent portion of surface 50. When it is desired to provide haptic output to finger 52L (e.g., when finger 52L taps against surface 50 or slides past a detent boundary on surface 50), a haptic output device such a device 134 (e.g., an electromagnetic actuator) may vibrate or provide other haptic output that is conveyed through support structure 114 (e.g., a table top) as propagating vibrations 136. In this way, a user interacting with surface 50 may be provided with haptic feedback while interacting with surface 50 (e.g., a tabletop surface or the surface of other support structures that are free of haptic output devices). Visual feedback can also be provided by system 8 (e.g., by displaying visual elements on surface 50 with a display in a head-mounted device or using a projector).

Figure 14:
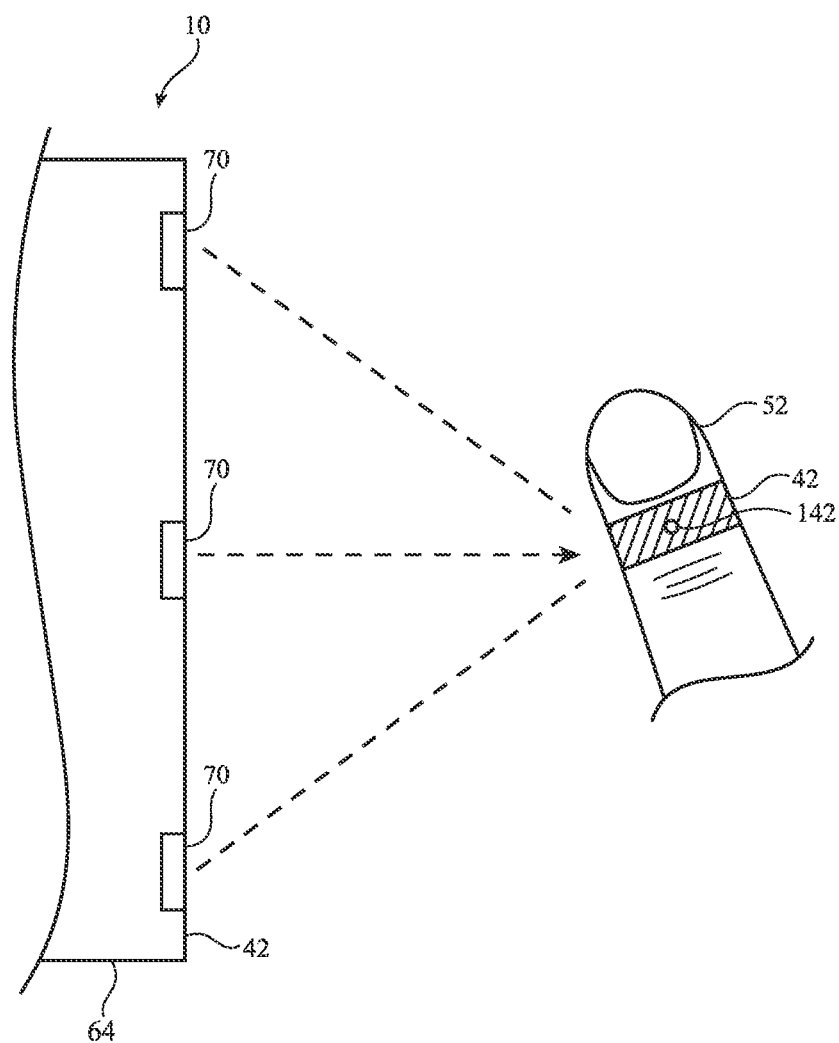
FIG. 14 is a diagram showing how a finger-mounted device with a marker may be used in providing an electronic device with user finger input in accordance with an embodiment.

FIG. 14 shows how sensors such as cameras 70 or other sensors on housing 64 of device 10 may be used to monitor the position of a visual marker on a user's finger 52 such as marker 142. Marker 142 may be formed on a finger-mounted device such as device 140, on the outer surface of a glove, etc. Marker 142 may be a passive symbol (e.g., a cross-shaped symbol or other visually recognizable symbol) and/or may include one or more light sources such as light-emitting diodes or lasers (e.g., light-emitting devices organized in a recognizable asymmetric pattern to facilitate detection by cameras 70 and/or light-emitting devices that each emit light that is modulated with a different respective modulation scheme). Based on information from cameras 70, control circuitry 12 can determine the location of finger 52 and can convey this information within system 8.

Figure 15:
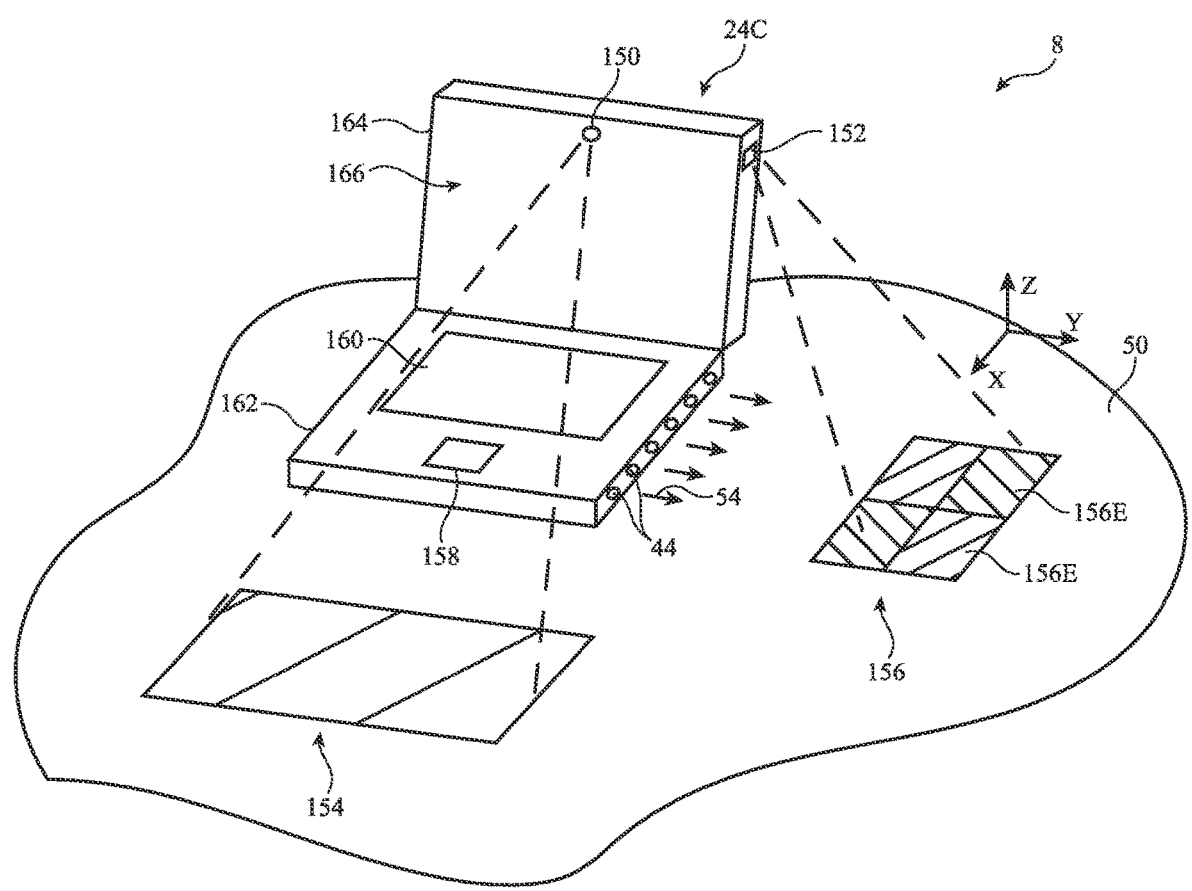
FIG. 15 is a diagram of an illustrative system in which a projector is used to illuminate workspace surfaces with images containing selectable visual elements such as selectable regions with virtual elements such as keys or icons in accordance with an embodiment.

As shown in FIG. 15, system 8 may include electronic devices such as laptop computers or other devices with displays. Illustrative electronic device 24C may, for example, be a laptop computer having a display such as display 166 mounted in upper housing 164 and having components such as keyboard 160 and trackpad 158 in lower housing 162. Housings 162 and 164 may rotate relative to each other about a hinge. Sensors 44 may be mounted along the edge of housing 162 and/or elsewhere in device 24C to gather user finger position input from an adjacent portion of surface 50 or other suitable location. If desired, device 24C may include projectors (displays that project images) such as projectors 152 and 150. Projector 150 may, for example, project an image such as image 154 onto surface 50 and projector 152 may, for example, project an image such as image 156 onto surface 50. Projectors 150 and 152 may be mounted on housing 164 or other portions of device 24C. If desired, device 24C of FIG. 15 may be a cellular telephone, tablet computer, or other device with a touch screen display. For example, display 166 may be a touch sensitive display mounted in housing 162 (e.g., a cellular telephone housing associated with a cellular telephone or a tablet computer housing associated with a tablet computer) and upper housing 164 may be omitted).

In some configurations, the images projected by projector(s) in device 24 may contain virtual keys or other content with visual elements that a user may select with finger input. As an example, projector 152 may project an image such as image 156 that contains multiple selectable regions such as regions 156E (e.g., visual elements such as file folder icons, keys such as alphanumeric keys, menu options, labels with text, graphics, and/or moving image content, etc.). A user may press finger 52 against a desired portion of surface 50 overlapping one of regions 156E to select that region (e.g., to select an icon, press a virtual button, to drag and drop content along surface 50, and/or to otherwise interact with device 24C and system 8). As the user manipulates visual elements in projected image 156, device 24C may update content in image 156 and/or content on display 166 accordingly.

Figure 16:
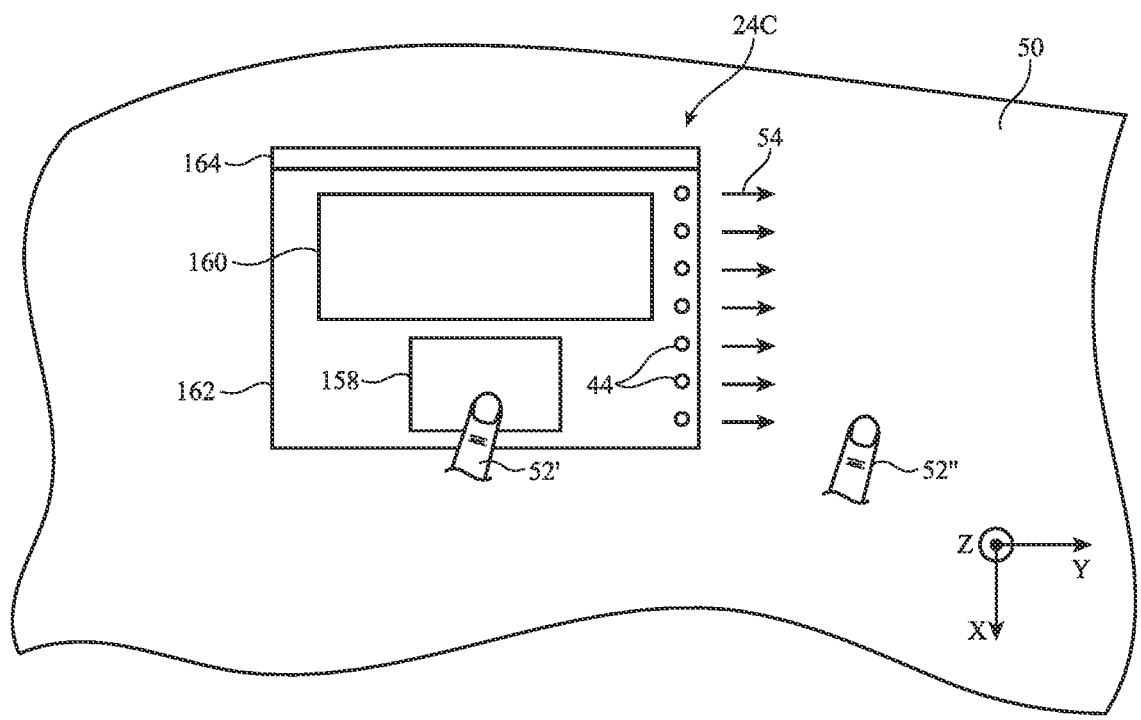
FIG. 16 is a top view of an illustrative electronic device such as a laptop computer with sensors configured to gather input from two different regions in accordance with an embodiment.

FIG. 16 shows how device 24C of FIG. 15 may gather user input from a finger such as finger 52' on trackpad (two-dimensional touch sensor) 158 while also gathering user input from another finger such as finger 52" on surface 50 in range of signals 54 from sensors 44. If desired, user input may involve gestures (taps, swipes, pinch-to-zoom input, and/or other input) that are gathered from both finger 52' and 52" at the same time (as an example).

Figure 17:
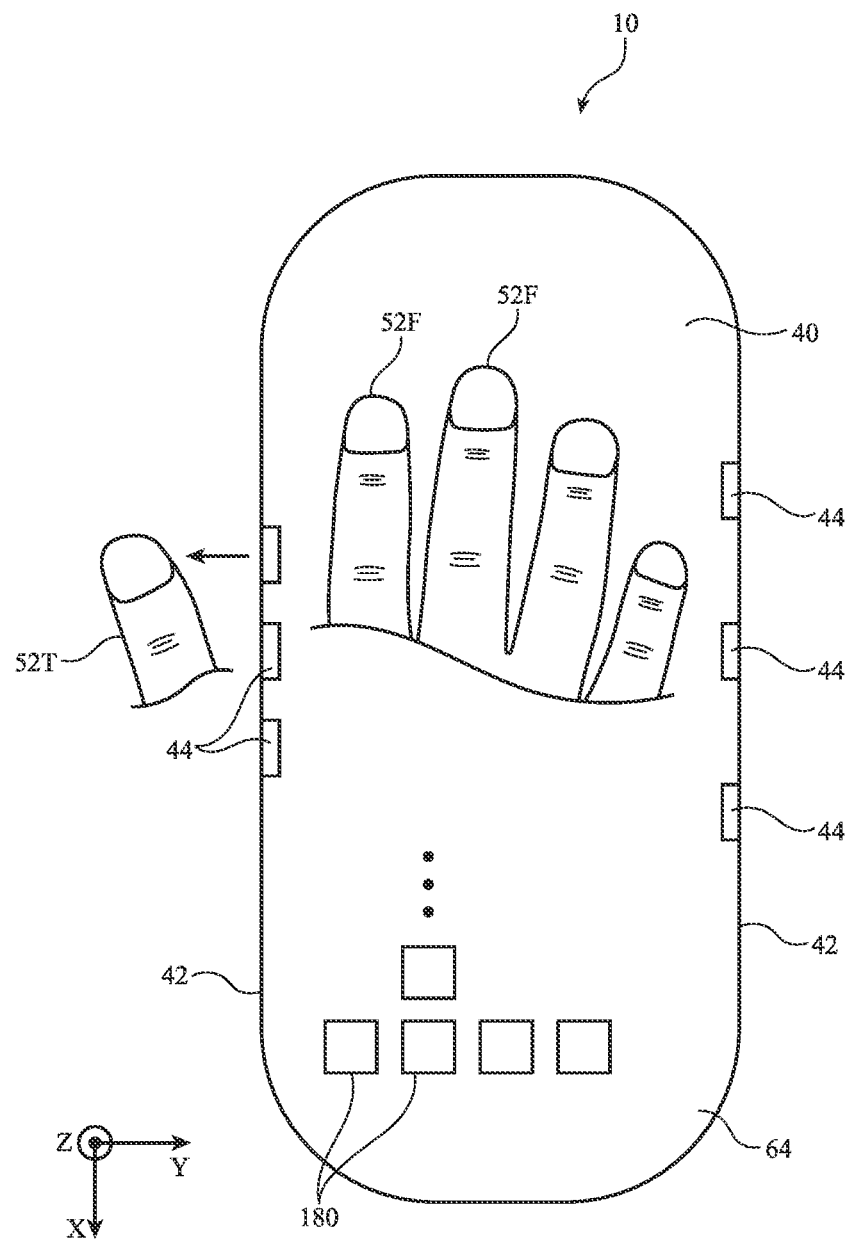
FIG. 17 is a top view of an illustrative electronic device with a sensor to monitor a user's thumb position in accordance with an embodiment.

FIG. 17 is a top view of an illustrative pointing device such as a mouse (device 10) having sensors on upper surface 40 and side surfaces 42 of housing 64. These sensors may include, for example, sensors 44 on one or both sidewall surfaces 42 of device 10 (e.g., to accommodate left-handed and right-handed users). Sensors 44 may monitor the position of user fingers such as thumb 52T. Device 10 may also have sensor on the top of housing 64 for monitoring the position of other user fingers 52F. The sensors on upper surface 40 of housing 64 may include optical sensors, force sensors, touch sensors, capacitive sensors, and/or other sensors. As an example, the sensor circuitry on upper surface 40 may include an array of capacitive sensor electrodes such as electrodes 180 for monitoring the position of fingers 52F (e.g., for gathering information on a user's grip on device 10, for gathering user touch gestures made on upper surface 40, for gathering three-dimensional air gestures made above device 10, etc.).

Figure 18:
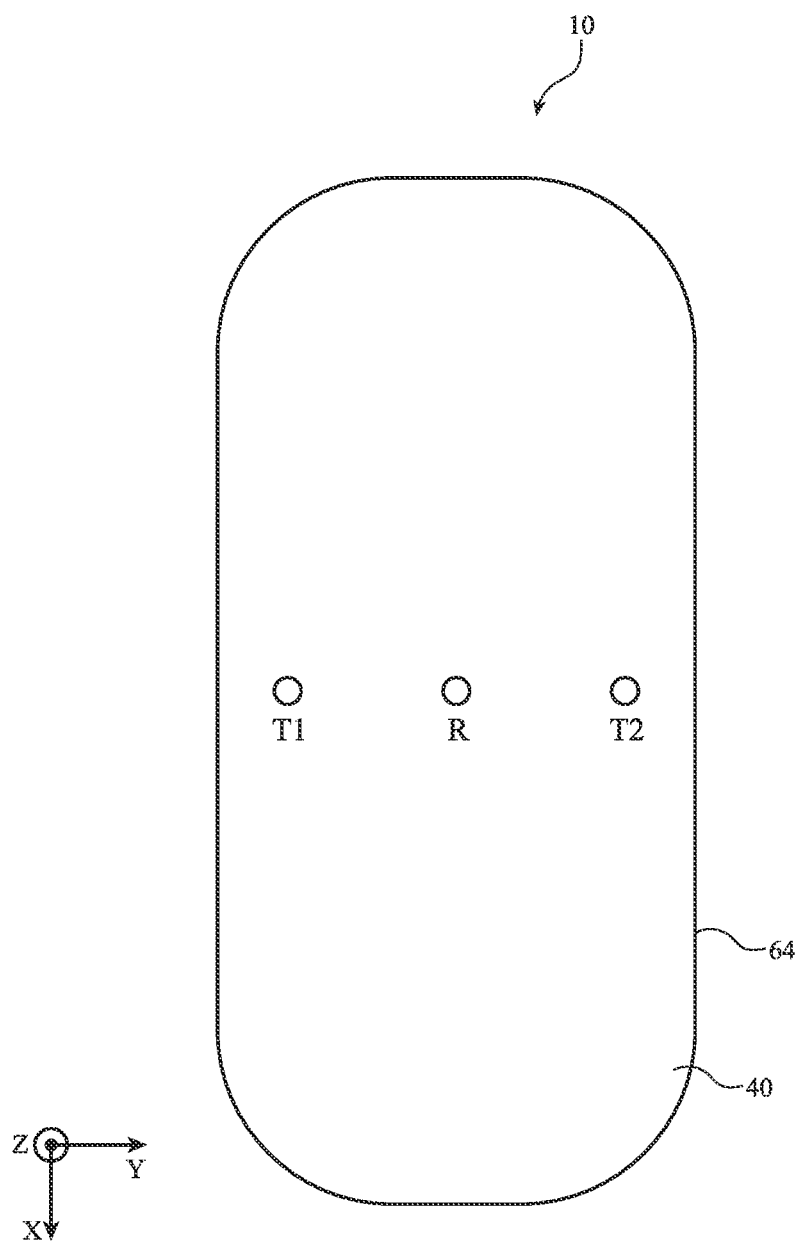
FIGS. 18 and 19 are top views of an illustrative electronic device with proximity sensors for measuring hand position and movement in three-dimensional space in accordance with an embodiment.
Figure 19:
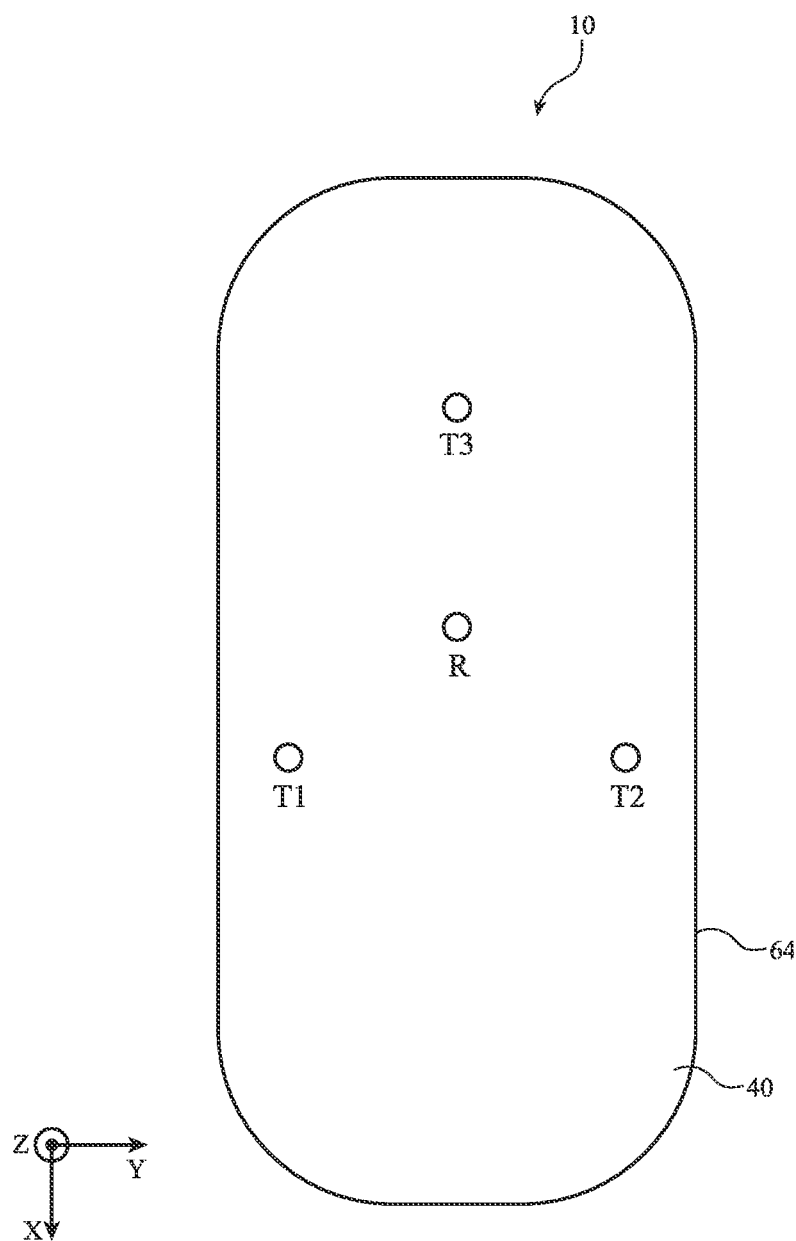

FIGS. 18 and 19 are top views of an illustrative configuration for a pointing device such as a mouse (device 10) having optical proximity sensor structures on upper surface 40 of housing 64. Optical proximity sensors can be formed using light-emitting devices such as infrared light-emitting diodes or infrared-light emitting lasers that emit infrared light and using light detectors such as infrared photodiodes that detect the emitted infrared light after the emitted infrared light has reflected off of a hand of a user or other external object. Light-emitting diodes and light detectors for the optical proximity sensor structures of device 10 may be mounted under portions of housing 64 that are transparent to infrared light (e.g., an infrared-transparent acrylic top housing wall or other polymer top housing wall that is transparent to infrared light and that blocks visible light to hide internal components from view from the exterior of device 10).

In the example of FIG. 18, device 10 has two infrared-light-emitting diodes T1 and T2 and has a centrally located infrared light detector R. In the example of FIG. 19, device 10 has three light-emitting diodes T1, T2, and T3 and a centrally located infrared light detector R. In, any suitable number of optical proximity sensor light sources may be located on surface 40 of housing 64 (e.g., under a transparent portion of the housing forming surface 40) and/or any suitable number of optical proximity sensor light detectors may be located on surface 40 of housing 64. The examples of FIGS. 18 and 19 are merely illustrative.

Using optical proximity sensors of the type shown in FIGS. 18 and/or 19, device 10 can detect user hand gestures (e.g., three-dimensional gestures). The gestures may involve lateral movement (e.g., in the X-Y plane), vertical movement (e.g., changes in Z height), may involve changes in horizontal position across device 10 (e.g., movement along the +X or −X direction), may involve movement parallel to the Y axis of FIGS. 18 and 19 (e.g., parallel to the longitudinal axis of device 10 in configurations of the type shown in FIGS. 18 and 19 in which housing 64 is elongated), changes in position within the ZX plane, and/or other suitable three-dimensional hand gestures. Illustrative gestures and device operations that can be controlled using these gestures include left and right swipe gestures (e.g., gestures that turn pages, etc.), scroll up and scroll down gestures (e.g., gestures that scroll a displayed image up or down as a user moves a hand in the +Y or −Y direction), zoom in and zoom out gestures (e.g., by moving a hand in the +Z or −Z direction), perform the functions of a three-finger trackpad swipe in some devices), gestures in the X-Y plane (e.g., lateral gestures) to control cursor position or joystick movement, gestures to control three-dimensional object rotation and placement when manipulating a virtual object on a display, gestures that control zooming and movement (e.g., in a map application), and/or other gestures and device operations. If desired, device 10 or associated equipment may be configured to turn on (awaken from a low-power sleep state) and perform data syncing operations in response to detection of hand proximity and/or other hand position and/or motion. Proximity sensor configurations for device 10 of the type shown in FIGS. 18 and 19 may be used in conjunction with components such as sensors 44 and/or any other sensing circuitry of the type described in connection with FIGS. 1-17.

The foregoing is merely illustrative and various modifications can be made to the described embodiments. The foregoing embodiments may be implemented individually or in any combination.

What is claimed is:

1. An electronic device, comprising:
   a housing;
   an image sensor mounted in the housing and configured to track a first movement of a first finger at a first location on a surface, wherein the image sensor faces a first direction;
   an additional sensor mounted in the housing and configured to track a second movement of a second finger at a second location;
   a first display mounted in the housing and configured to project first image content, wherein the first image content is overlaid onto the surface;
   a second display mounted in the housing and configured to display second image content, wherein the second display faces a second direction different from the first direction, wherein the second display is movable relative to the image sensor and the additional sensor, wherein the second image content is adjusted in response to the first and second movements, and wherein the first and second movements are tracked at the same time.

2. The electronic device defined in claim 1 wherein the image sensor comprises an infrared camera configured to measure three-dimensional hand gestures.

3. The electronic device defined in claim 1 wherein the additional sensor comprises a touch sensor.

4. The electronic device defined in claim 1 wherein the first location on the surface overlaps the first image content.

5. The electronic device defined in claim 1 further comprising a third display mounted in the housing.

6. The electronic device defined in claim 1 wherein the image sensor is one of first and second image sensors in the housing that capture stereoscopic images of the first movement of the first finger.

7. The electronic device defined in claim 1 wherein the image sensor comprises a visible light camera.

8. The electronic device defined in claim 1 wherein the image sensor is configured to track third movements by the first finger above the surface.

9. The electronic device defined in claim 8 wherein the third movements comprise three-dimensional gestures.

10. An electronic device, comprising:
a housing;
a first display configured to project a first image that is overlaid onto a portion of a surface;
a second display configured to display a second image; and
a first sensor configured to detect a first finger gesture from a first finger on the surface, wherein the first and second displays are movable relative to the first sensor, and wherein the first image is adjusted in response to the first finger gesture;
a second sensor configured to detect a second finger gesture from a second finger, wherein the first and second displays are movable relative to the second sensor, wherein the second image is adjusted in response to the second finger gesture and the first finger gesture, and wherein the first finger gesture and the second finger gesture are tracked at the same time.

11. The electronic device defined in claim 10 wherein the first sensor comprises at least one of a visible light camera or an infrared camera.

12. The electronic device defined in claim 10 wherein the first finger gesture includes first finger input on the portion of the surface that is used to adjust the second image.

13. The electronic device defined in claim 10 wherein the second display comprises a touch-sensitive display.

14. The electronic device defined in claim 10 wherein the first sensor comprises a stereoscopic camera.

15. The electronic device defined in claim 10 wherein a portion of the first image is dragged-and-dropped across the surface in response to the first finger gesture.

16. An electronic device, comprising:
a housing;
a first display mounted in the housing and configured to overlay first image content onto a surface;
a second display mounted in the housing and configured to display second image content;
at least four sensors mounted in the housing and configured to detect first finger movements of a first finger including three-dimensional hand gestures above the surface and first finger input from the first finger on the surface, wherein the first and second displays are movable relative to the at least four sensors, and wherein the first image content is adjusted in response to the first finger movements; and
an additional sensor mounted in the housing and configured to detect second finger input from a second finger, wherein the first and second displays are movable relative to the additional sensor, wherein the second image content is adjusted in response to the second finger input and the first finger movements, and wherein the second finger input and the first finger movements are detected at the same time.

17. The electronic device defined in claim 16 wherein the at least four sensors comprise an infrared image sensor.

18. The electronic device defined in claim 16 further comprising a third display mounted in the housing, wherein the third display is configured to project third image content.

19. The electronic device defined in claim 16 wherein the first image content comprises a virtual button and wherein the first finger input comprises a selection of the virtual button.

20. The electronic device defined in claim 16 wherein the first image content comprises a visual element and wherein the first finger input comprises a drag-and-drop of the visual element across the surface.

* * * * *